United States Patent [19]

Tollefson et al.

[11] 4,018,898

[45] Apr. 19, 1977

[54] METHOD OF USING POTATO SUPPLEMENT IN COMMERCIAL BREAD MAKING PROCESSES

[75] Inventors: Charles I. Tollefson, Rochester, N.Y.; Simon S. Jackel, Westport, Conn.; Jack K. Krum, Leawood, Kans.

[73] Assignee: R. T. French Company, Rochester, N.Y.

[22] Filed: Aug. 4, 1975

[21] Appl. No.: 601,357

Related U.S. Application Data

[63] Continuation of Ser. No. 430,180, Jan. 2, 1974, abandoned.

[52] U.S. Cl. ................................. 426/21; 426/26
[51] Int. Cl.² ........................................ A21D 8/04
[58] Field of Search .................... 426/21, 24, 26

[56] References Cited

UNITED STATES PATENTS

| | | | |
|---|---|---|---|
| 1,148,328 | 7/1915 | Kohman et al. | 426/26 |
| 1,580,487 | 4/1926 | Heimerdinger | 426/21 X |
| 2,744,825 | 5/1956 | Thompson et al. | 426/24 |

OTHER PUBLICATIONS

Braden, The Baker's Digest, June 1966, p. 83 Tx76155.

*Primary Examiner*—Raymond N. Jones
*Attorney, Agent, or Firm*—Shlesinger, Fitzsimmons & Shlesinger

[57] ABSTRACT

Potato granules are added in breadmaking with the surprising, unexpected results of reduction in mixing requirements, a higher level of water absorption, and increased retention of bread softness which means increased shelf life. Preferably the potato granules are added in an amount of 2 lbs. per 100 lbs. of flour. It has been found that the mixing speed of the dough can be decreased 20 RPM for each one percent of potato granules added, despite the increased water absorption which results from the addition of the potato granules. At the same time the increased absorption increases the yield of bread; and the bread remains soft even after 72 hours.

6 Claims, No Drawings

METHOD OF USING POTATO SUPPLEMENT IN COMMERCIAL BREAD MAKING PROCESSES

This is a continuation of application Ser. No. 430,180, filed Jan. 2, 1974, now abandoned.

This invention relates to commercial breadmaking, and more particularly to a method for employing potato supplement to extend the shelf life of commercially produced bread.

One of the major problems associated with commercially produced bread is that is has an extremely short shelf life — i.e., it becomes stale within a few days after it has been baked. To prevent customer discontent, therefore, it is necessary for most commercial bakeries to see to it that none of its bread remains on the shelves of grocery stores and other such outlets for more than perhaps 2 or 3 days. Bread which has not been sold within this period is regarded as stale, and is usually removed from the shelves or sold at discount prices. Hence, if the shelf life of commercial bread could be extended even for 1 day, which amounts to an increase of approximately 33 to 50% in its shelf life, the loss to commercial bakeries would be reduced substantially; and ultimately should result in some reduction in price of bread itself.

It has long been known that the common potato is an excellent yeast food, and that when used in breadmaking it operates to increase the water-absorption of the bread as well as causing it to remain fresh and soft for longer periods. Potato flour at levels up to 3%, for example, was included as an optional ingredient in the Bread Standards issued in 1955. (See also "The Bakers Digest," December 1962, pages 46 to 49 for a laboratory report on use of dehydrated potato flakes in 3 and 6% quantities in bread.) Despite these known advantages, however, the use of potato flakes or flour in breadmaking was substantially abandoned, at least with respect to commercially produced bread, when automated systems of breadmaking were introduced. The reason was that the addition of potato to the bread formulation, assuming maintenance of satisfactory consistency, resulted in undersirable open grain, loss of volume and loss of symmetry in the bread. Heretofore, therefore, there has been no satisfactory method of using potato supplement in bread produced by contemporary, commercial breadmaking processes.

One object of this invention, therefore, is to provide a method for making bread in which a potato supplement may be incorporated in the dough and still produce a bread comparable in quality with breads produced by the usual commercial methods. To this end, an object of this invention is to provide a method which permits the incorporation of a potato supplement in commercial breadmaking processes without causing the resultant bread to exhibit the undesirable open grain, loss of volume and loss of symmetry heretofore encountered when potato supplements were added to commercial bread formulation.

Another object of this invention is to provide a method for increasing the shelf life of commercially produced bread by providing a practical method for incorporating small quantities of potato in commercial breadmaking processes.

Still another object of the invention is to reduce the overall cost of breadmaking.

A more specific object of this invention is to provide a practical method for using potato granules in commercial bread-making processes to improve yields and to increase the shelf life of the resultant bread.

Other objects of the invention will be apparent hereinafter from the specification and from the recital of the appended claims.

Before describing in detail the use of a potato supplement in accordance with this invention, it should be pointed out that there are, in essence, two different commercial breadmaking processes, one of which is known as the conventional process, and the other of which is referred to as the continuous process. In both processes the ingredients of the bread are expressed as percentages of 100 pounds of wheat flour in the mix of formulation.

In the so-called conventional process, a typical batch or bake could be based, for example, upon 800 lbs. of wheat flour. A "Sponge" containing 60 to 70% of this amount of flour, some water, yeast, and yeast nutrients is mixed and allowed to ferment for about 4 hours under controlled temperature and humidity. Salt and mold inhibitor are omitted from the sponge because they inhibit fermentation. At the end of the fermentation period the salt, and mold inhibitor and remaining ingredients are added to the sponge in a remix operation to yield a dough. The dough may be given 20 minutes floor time to recover from the mechanical damage of the remix. The dough then goes to makeup equipment comprising, for example, scaling, kneading and rolling apparatus, and then into baking pans. It is pan proofed at 82° to 90° F for 60 minutes during which time it expands four to five times in volume. It is then baked 18 to 20 minutes at 425° F, then cooled for 1 hour, then sliced and wrapped. In practice, an 800 lb. batch can be commenced every 16 minutes in commercial operation.

The continuous process is based on a pre-ferment (brew or broth) instead of a "sponge." There ordinarily is little or no flour in the broth, which, therefore, is usually a liquid-pumpable system. However, new methods are becoming known in which 40 to 50% of the flour, and up to 70% of the flour, is added to the broth under conditions in which it is still pumpable. The broth, containing yeast, nutrients, sugar and water, is fermented 2½ hours at about 90° F. This part of the process is a batch operation. Generally there are five fermentation tanks, and one of the five is "set" or re-batched every half hour. At the end of the fermentation the broth is pumped into a transfer tank, and from there through a heat exchanger to a continuous screw incorporator where other ingredients such as flour, salt, shortening, etc., are added. This is followed by 2 minutes of high speed mixing at 105° to 110° F. The high-speed mixing used in the continuous process introduces undesirable shear and weakens the dough (much weaker than conventionally processed dough), but results in a much more uniform, close grained product. The continuous process equipment usually handles about 4200 lbs. of flour per hour.

In commercial breadmaking all ingredients, as noted above, are expressed as a percentage of 100 lbs. of flour. For example, a typical formulation based upon 100 lbs. of flour might be as follows:

| INGREDIENTS | NUMBER OF LBS. |
| --- | --- |
| Flour | 100 lbs. |
| Water | 62 lbs. |

-continued

| INGREDIENTS | NUMBER OF LBS. |
|---|---|
| Sugar (Dextrose)) | 8 lbs. |
| Shortening (Lard) | 3 lbs. |
| Yeast | 2 ½ lbs. |
| Salt | 2 lbs. |
| Dough Improvers | ½ lb. |
| Yeast Nutrients | ½ lb. |
| Calcium Propionate | ¼ lb. |

In the above formulation the water would be expressed as 62%, sugar as 8%, shortening 3%, etc.; and the dough improver could include, for example, mono and di-glycerides or "Verv" (calcium stearoyl-2-lactylate), oxidizers, etc. For this formulation 100 lbs. of flour yields approximately 180 lbs. of dough. Sugar is lost by fermentation, and water is subsequently baked off to yield about 160 lbs. of bread containing aproximately about 36% moisture.

As noted above, it has been found that the yield of bread versus starting dough can be increased significantly by properly incorporating in the formulation small quantities of potato supplement in the form of conventional potato flake, or potato flour. However, heretofore the addition of the potato supplement to the dough has resulted in bread having undesirable qualities as regards grain, volume, and symmetry.

We have discovered, however, if the potato supplement is added in the form of potato granules, the resulting bread will be not only of a quality comparable with standard breads but will have increased softness and shelf life.

Potato granules are made by first immersing potatoes in a hot caustic solution, which softens the skins, and then passing them through a washer where high pressure jets of water remove the softened skins. By varying the concentration of caustic, or temperature, or time of immersion, the degree of peel removal can be varied. The next step is trimming to remove defective portions of the tuber, such as bruise, green ends, etc. This is a manual operation. The potatoes are then sliced into slabs about ¾ inch thick to promote uniformity of cooking, and are then washed to remove starch freed by the slicing operation. This is followed by a bisulfite dip to prevent discoloration due to enzyme action. These are all preparatory steps. The first real processing step is precooking.

Potato tissue consists of individual cells cemented together by the middle lamella pectin. The cell wall is composed largely of cellulose, hemicellulose, and protopectins. Each cell contains a nucleus, protoplasm, starch granules, water, etc. When the temperature of the tuber is raised above 122° F, water passes from the non-starchy parts of the cell into the starch granules which then start to swell. The swelling of the starch causes the cells to round off and creates a pressure tending to separate the cells. When fully swollen, the potato cells are fragile and quite susceptible to mechanical rupture which would release starch, but precooking increases resistance of the tissues to degradation because at temperatures above 122° F the cellular membranes begin to lose integrity, allowing intercellular electrolytes to contact the cell wall and activate an enzyme called pectin methylesterase. This enzyme demethylates the cell wall pectin resulting in an increase in carboxyl groups. $Ca^{++}$ and $Mg^{++}$ from the interior of the cell then form metal bridges between the carboxyl groups increasing resistance to further thermal degradation. When the temperature of the tuber rises above 158° F the enzyme is rapidly inactivated and has no further effect on the pectins. Thus, precooking is usually done in water about 160° F; and 20 minutes is usually sufficient time. If the precook is too short, there are not enough metal bridges to strengthen the tissue sufficiently. If the precook is too long, too many bridges may be formed, and soluble starch may exude from the cells to give a sticky product.

The benefits of precooking can be enhanced by cooling the precooked potatoes in water at about 70° F for 20 minutes. This reduces the "blue value," a measure of free starch, by as much as 60%, probably by allowing retrogradation or insolubilization of some of the gelatinized starch. This step is particularly beneficial for low solids potatoes.

The precooked and cooled potato pieces are next cooked in steam at 204° F for about 30 to 35 minutes. This completes the swelling of the starch within the cell and the intercellular cements lose most of their adhesive properties. The cells can be separated fairly readily by a mild shearing action. However these swollen cells are still fragile and susceptible to mechanical rupturing in spite of the precooking. The secret of the granule process is in a gentle separation of cells and removal of moisture from those swollen cells which become less turgid and are then able to withstand considerable manipulation without damage. This is accomplished by dropping the cooked potato into a bed of seed or addback in the mash-mixer. Seed is merely previously dried, granulated potato. The mash-mixer paddles gently lift the potato pieces through the seed bed. This applies mild shear to the slabs so that the cells separate gently and moisture is transferred to the seed.

From the mash-mixer the product, which resembles a moist powder, goes via the holding belt and remixer to the drier.

The product from the drier has about 12–13% moisture. The first portion of the product is drawn off to supply seed for the addback system. Another portion of the excess product is coarse screened and disposed of as cattle feed. The intermediate fraction is returned to the system; and the fine fraction becomes the potato granule product used in the breadmaking.

Tests on both conventional and continuous process have indicated that by incorporating potato granules in the mix it is possible to produce potato-supplemented bread having greater softness and longer shelf-life than standard bread, and without producing any undesirable changes in symmetry, grain, texture and color of the bread.

Referring first to the continuous process, the bread formulation and procedures followed to produce a continuous process "control" bread for use as a standard in laboratory tests were as follows:

The first step is the preparation of the so-called "broth."

| Broth Preparation: (All percentages based on the flour weight) | | |
|---|---|---|
| Water (variable) | 71.0% | 3640.0 grams |
| Sugar | 8.0% | 416.0 grams |
| Salt | 2.25% | 117.0 grams |
| Dairy blend ("Unilac 55" Dry Milk Prod., Inc.) | 3.00% | 156.0 grams |
| Yeast Food | 0.5% | 26.0 grams |
| Calcium Acid Phosphate | 0.1% | 5.2 grams |
| Calcium Propionate | 0.1% | 5.2 grams |

| Broth Preparation: (All percentages based on the flour weight) | | |
|---|---|---|
| Yeast | 2.5% | 130.0 grams |

The broth was fermented for 2½ hrs. in the water bath at 87° F. (Carbon dioxide and alcohol as fermentation products help to disperse gluten and consequently do reduce the mixing time. About 3% of the sugar is fermented out. Both improve the yeast activity considerably.).

The second step in the processing is the preparation of the dough or pre-mix.

| The "Dough" or "Pre-mix" batter: | | |
|---|---|---|
| Flour | 100.0% | 5200.0 grams |
| Broth | as above | 4443.0 grams |
| Shortening Blend | 3.0% | 156.0 grams |
| Oxidation solution | 12.5 ppm $KIO_3$ <br> 50 ppm $KBrO_3$ | 52.0 cc |

The above ingredients were pre-mixed in a Hobart Mixer for 45 seconds at low speed and 15 seconds at medium speed. At this stage solid and liquid materials were incorporated until the total mass was sufficiently mixed to have no obvious dry lumps or unusually soft portions. This pre-mixed blend was then transferred rapidly into the loading cylinder of a Wallace and Tiernan Laboratory Unit, located directly over the developer bowl. A hydraulically operated piston forced the mixture from the loading cylinder into the developer bowl at a constant rate. Development took place during the passage of the mixture between the running impellers in the developer bowl. The impeller speed is variable and controlled to obtain optimum dough development at the point of extrusion.

The essential motion during such mixing is stretching and folding. This results in rupturing disulfide (sulfur to sulfur) linkages in the gluten of the flour. Dough is developed when optimum film forming and gas retaining capacity is present. At this point it assumes a velvety appearance and it is ready for extrusion. The extrusion orifice is located on the side at the bottom of the developer bowl. The extruded dough was manually divided and panned. After that the dough was proofed to height (about 1 inch above the pan) and baked for 18 minutes at 425° F.

When the process described above was modified by the addition of potato granules, the potato granules absorbed twice their weight in additional water.

Usually increasing the absorption requires increased mixing. However, for the optimum development of the dough, which is characterized by optimum gas retention, and for satisfactory dough stability during mechanical handling, and large loaf volume, it is important to minimize mixing and temperature rise. Mixing experiments revealed that doughs containing 3% potato granules surprisingly required about 20 RPM less mixing for each 1 percent of potato granules than standard dough used as controls, despite the increased water absorption. At the same time it was found that the increased absorption increased the yield.

A series of compressimeter tests revealed, moreover, that bread containing 3% potato granules was softer than the control bread and remained softer after 72 hours. Oxidation series indicated that a level of 60 ppm potassium bromate ($KBrO_3$) and 15 ppm potassium iodate ($KIO_3$), which was 20 percent above the level in the control, also was desirable to produce the improved, softer bread. Dough strengthening materials such as wheat gluten (e.g., 0.33% for each 1% of potato granules) and "Emplex" (0.17% for each 1% of potato granules) were also added to the doughs containing potato granules.

Potato granules have also been tested as an addition in batter whip white breads produced under conditions of commercial continuous bakery operation, where regular liquid ferment(broth) was used without addition of flour.

The standard or control bread for this process was produced as follows:

| Formula: | | |
|---|---|---|
| Water | 68.0% | 1260 lbs |
| Dextrose | 8.0% | 150 lbs. |
| Sucrose | 2.7% | 50 lbs. |
| Yeast | 3.0 | 55 lbs. |
| Milk | 1.5 | 26 lbs. 4 oz. |
| Yeast Food | 1.0% | 18 lbs. |
| Salt | 2.2% | 41 lbs. |
| Ca-Phospate | 0.108% | 2 lbs. |
| Mold Inhibitor | 0.06% | 1 lb. 4 oz. |
| "Verv" | 0.16% | 3 lbs. |
| Short. blend | 3.5% | 65 lbs. |
| Flou- per broth | 100.0% | 1856 lbs. 4 oz. |
| Total Ingredient Weight | | 3510 lbs. 12 oz. |

| Processing Conditions | |
|---|---|
| Broth fermentation time: | 2 hrs. 15 min. |
| Broth temperature at transfer: | 85° F |
| Broth temperature at premix: | 65° F |
| Dough temperature at developer: | 83° F |
| Dough temperature out of developer: | 98° F |
| Mixing speed: | 285 RPM |
| Amperage: | 130 |
| Proof time: | 55 min. |
| Proof box temp: | Dry: 110° F Wet: 106° F |
| Time in oven: | 18 min |
| Type of oven: | BP Tunnel |

In this commercial process the yield was increased and the bread shelf-life was improved by adding to this normal or "control" formulation, 2% of potato granules. The added ingredients were: 37 lbs. of potato granules, 6 lbs. of "Verv" (calcium stearoyl-2-lactylate), and 125 lbs. of extra water (6.5%). Also, to supplement the usual oxidation ingredients of 16 Oxitabs (each comprising 50 ppm. pot. bromate and 10 ppm. pot. iodate per 100 lbs. of flour) and 4 Bromitabs (each comprising 60 ppm. pot. bromate per 100 lbs. of flour), which were added to the broth during the fermentation period (30 to 60 minutes after setting), two more Oxitabs were added to bring the oxidation level to approximately 63 ppm. pot. bromate and 10 ppm. pot. iodate. The mixing speed was also reduced from 285 RPM to 275 RPM.

Other tests were made with variations in the amounts and proportions of ingredients added. For instance, using 37 lbs. of potato granules, 3 lbs. of "Verv," and 148.5 lbs. of extra water (8%). Oxidation: 16 Oxitabs and 6 Bromitabs, which were added to the broth approximately 120 min. after setting, thus producing a level of 65 ppm. pot. bromate and 8.6 ppm. pot. iodate. Here the mixing speed was again reduced to 275 RPM.

Doughs containing 2% of potato granules appeared to have better handling properties when the following adjustments in the formula were made:

Extra water increased to 4% for each 1 percent of potato granules; level of "Verv" reduced to 0.085% for each 1 percent of potato granules; iodate reduced to approximately 9 ppm; and vital wheat gluten omitted. The bread produced in these tests were compared with regular production bread; and all samples showed very good appearance, good symmetry, and had good flavor. Resiliency, mouth-feel and flavor checked the morning after the bake, moreover, were as good as the control.

It was found that it made no difference whether the potato granules were added at the "set" of the broth or after fermentation. However, from a practical standpoint it is better to add the potato granules at the "set" of a broth along with the other ingredients since an extra step and extra work are avoided and any danger of overlooking the addition of the potato granules is obviated.

The sidewalls of the modified bread were slightly stronger than standard bread; but the grain texture of the modified bread was very close to that of the standard bread. More importantly, the modified bread was softer, and remained softer than the normal bread for several days.

Still another field test conducted on a continuous, commercial bread making process in which flour was not included in the broth, the yield and bread shelf-life were again enhanced by the addition of potato granules in small quantities. The control bread for this test was prepared in accordance with the following formula:

| Formula: | % | lbs. | |
|---|---|---|---|
| Water at 79° | 68.3 | 1230 | |
| Liquid sugar | 8.6 | 155 | |
| Granulated sugar | 2.7 | 50 | |
| Salt | 2.1 | 38 | |
| Yeast | 3.0 | 55 | |
| Yeast food | (21 Packette) | | |
| Guard (Calcium proprionate) | 0.17 | 3. | |
| "Verv" | 0.17 | 3. | |
| Total | | 1534 lbs. | |
| Less 2% ferm loss | | 31 lbs. | |
| Available broth | | 1503 lbs. | |
| | | | ozs. |
| Flour | 100.0 | 1794. | 6 |
| Shortening | 3.2 | 58. | 1 |
| SMG (succinylated monoglyceride) | 0.26 | 4. | 8 |
| Total short. blend | | 62 lbs. | 9 ozs. |
| CM-28 (L cysteine whey Mix) | 0.15 | 27. | 3 |
| Enrichment Wafers | 36 | | |
| Oxidation: Bromitabs | 4 | Oxitabs 16 | |
| Total weight | | 3387 lbs | 2 oz. |

To produce bread according to the present invention, potato granules were added to the water at the "set" of the broth along with the other ingredients. They were easily incorporated into the liquid. The level was 2% (37 lbs.). With the potato granules there were also added 7% (130 lbs.) of extra water, 0.17% (3 lbs.) extra of "Verv," and 2 extra tablets of Bromitabs, thus bringing the oxidation level to 65 ppm. of potassium bromate and 9 ppm. pot. iodate per 100 lbs. of flour. The broth fermentation time was 2 hrs. plus 30 min. for transfer. The temperature at the transfer was 84° F and at the pre-mix 65° F. The dough temperature before the developer was 86.5° F and out of the developer 99° F. And it was found that the mixing speed could be reduced to 245 RPM, as compared to the control mixing speed of 270 RPM.

The reduction of the mixing speed resulted in a corresponding drop in the power required to operate the mixer as reflected, for example, by a change in the amperage from 138 amps to 132 amps. The quality of the bread produced by this last-described modified process was comparable to that of regular production bread; and more importantly compressimeter tests taken 96 hours after baking resulted in a reading of 4.7 for the potato supplemented bread as compared with 6.0 for regular production bread. Lower compressimeter number indicates softer bread, which gives better shelf life. Moreover, the potato granules increase the yield of bread, thereby, in effect, delivering the potato granules to the baker at little or no additional cost.

The addition of potato granules in bread formula, then, resulted in the unexpected finding, which was not anticipated by experts skilled in the art of baking, that the mixing requirement, instead of being increased by the addition of granules and water, was decreased substantially, approximately 10 to 15 percent in some instances. This is highly favorable particularly as regards costs.

While the present invention is particularly advantageous in the continuous process of breadmaking, it has also real merit when applied to the so-called "conventional" breadkmaking process.

A typical formula for laboratory tests conducted in connection with the "conventional" process is:

| Sponge: | | |
|---|---|---|
| Flour | 62.5% | 400.0 grams |
| Water (72° F) | 41.0% | 262.4 grams |
| Yeast Food | 0.5% | 3.2 grams |
| Yeast | 2.5% | 16.0 grams |
| | | |
| Dough: | | |
| Flour | 37.5% | 240.0 grams |
| Water | 22.0% | 140.0 grams |
| Sugar | 7.0% | 45.0 grams |
| Lard | 3.0% | 19.0 grams |
| Unilac 55 | 2.0% | 12.8 grams |
| Salt | 2.0% | 13.0 grams |
| Emulsifier | 0.2% | 1.3 grams |
| | | |
| Processing Conditions | | |
| Sponge fermentation | 3 ½ hrs. | |
| Dough mixing time | Between 5 and 7 min. | |
| Dough temperature | 82° F | |
| Proof time | Between 46 and 52 min. | |

To such a formula 3% of potato granules were added with varying proportions of water added in ratios of 1 to 1, 2 to 1, and 4 to 1. Also, tests were carried out in which 6% of potato granules were added again with water varying in ratios from 1 to 1 to 4 to 1. It was found that loaves of bread produced from batches where 3% of potato granules were added to the mix with water in a ratio of 4 to 1 by weight and where 6% of potato granules were added with 3 to 4 times as much water by weight were the softest after 72 hours, that is, had the longest shelf life. The quality of the bread was acceptable. The 6% level potato granules, however, produced bread of poorer quality than that obtained where only 3% of potato granules were incorporated in the mix.

Still another test was conducted in a commercial bakery of the type which utilizes the continuous process in which 35 to 40% of the wheat flour is incorporated or set with the broth, and the remaining flour is not added until after the broth has been allowed to ferment. This test included raising the oxidation level to approximately 58 ppm. of potassium bromate, and 10 ppm. of potassium iodate. Results indicated that very good bread could be produced by adding from 1 to 3% potato granules together with additional water in the ratio of approximately, three water to one potato granule (by weight). The addition of the granules also necessitated a reduction in the mixing speed of from 245 RPM to a range from 214 RPM to 235 RPM.

One of the principal advantages of the novel process described herein is that it does not require any inconvenient changes in the normal commercial process and does not require any change in the apparatus heretofore employed to produce bread commercially. Moreover, since the modified formulations require less mixing, the power requirements of the associated apparatus are decreased, and the efficiency of the commercial process is correspondingly enhanced. More important, perhaps, the moisture absorption and shelf life of the bread produced by the modified process are increased, the latter significantly. This results in a substantial reduction in the costs because it materially reduces the checks heretofore required to keep stale bread from the counters of outlets. Together, these advantages more than offset the nominal increase in the cost of the added ingredients, the potato supplement and other additives.

While this invention has been described in connection with preferred methods of supplementing commercially produced bread with small quantities of potato granules, this application is intended to cover any modifications of the method as may fall within the scope of the invention or the limits of the appended claims.

Having thus described our invention, what we claim is:

1. A method of extending the shelf-life of bread produced commercially by a continuous process of the type in which a broth is prepared from a mixture including yeast, nutrients, sugar and water and is fermented for a period of time before being mixed by the impeller of a high speed blender with wheat flour and additives to form a developed dough ready for extrusion into pans, proofing and baking, comprising adding to the broth, before adding the wheat flour, a quantity of potato granules ranging from 1 to 3% by weight of the overall quantity of the wheat flour that is to be added to the mixture, said granules being of the type produced by the conventional "add-back" process, adding to the broth containing the flour a quantity of water ranging in the ratios of from 2 to 1 to 5 to 1 by weight of the potato granules added to the broth, and during the mixing of the flour and broth, operating the blender at a speed which is less, than the speed at which the blender operates when the broth does not contain said potato granules, proofing and baking the dough product.

2. A method as defined in claim 1, including adding as oxidation ingredients to the broth from 50 to 65 parts per million of potassium bromate and 5 to 15 parts per million of potassium iodate, per hundred pounds of flour in the dough.

3. A method as defined in claim 1, including adding to the broth calcium stearoyl-2-lactylate in the ratio of from 0.07 to 1 to 0.30 to 1 by weight of the potato granules added to the broth.

4. A method as defined in claim 1, wherein
said quantity of potato granules comprises approximately 2% by weight of said flour.

5. A method as defined in claim 4, including adding as oxidation ingredients approximately 65 ppm. of potassium bromate and 9 ppm. of potassium iodate, per hundred pounds of flour in the dough.

6. A method as defined in claim 1, wherein
40% of the entire flour in the dough is incorporated in the broth and fermented therewith,
said blender impeller speed is in the range of 225 to 240 RPM, and
oxidation ingredients are incorporated in the broth in the amounts of approximately 58 ppm. of potassium bromate and 10 ppm. of potassium iodate, per hundred pounds of flour in the dough.

* * * * *